United States Patent

[11] 3,593,942

[72] Inventor Gert Ingmar Rex
  Halmstad, Sweden
[21] Appl. No. 820,052
[22] Filed Apr. 29, 1969
[45] Patented July 20, 1971
[73] Assignee AB Autoindustri
  Halstad, Sweden
[32] Priority Nov. 5, 1968
[33] Sweden
[31] 14965/68

[54] AUTOMATIC LOCKING DEVICE FOR SAFETY BELTS
  8 Claims, 8 Drawing Figs.
[52] U.S. Cl. ................................................. 242/107.4
[51] Int. Cl. .................................................. B65h 75/48
[50] Field of Search ........................................... 242/107,
  107 SB, 107.4, 107.5, 107.6; 297/388; 280/150 SB

[56] References Cited
UNITED STATES PATENTS
2,953,315  9/1960  Lautier et al. ................  242/107.4
2,982,492  5/1961  Spielman .......................  242/107.4
3,203,641  8/1965  McFarlane et al. ............  242/107.4
3,323,749  6/1967  Karlsson ......................  242/107.4
3,442,467  5/1969  Stoffel ...........................  242/107.4

Primary Examiner—Stanley N. Gilreath
Assistant Examiner—Werner H. Schroeder
Attorney—B. Edward Shlesinger ABSTRACT: This automatic locking device for a vehicle safety belt has a shaft rotatably mounted within a casing for reeling up the belt. A rotor, which is secured to the shaft, carries a pivotal locking pawl normally held in an inoperative position by an inertia-responsive member which is spring-loaded to rotate with the rotor. Should the wearer be thrown suddenly forward, the acceleration causes the inertia-responsive member to rotate relative to the rotor, and to pivot the pawl into locking engagement with a locking tooth in the casing, thus to stop further withdrawal of the belt from the casing.

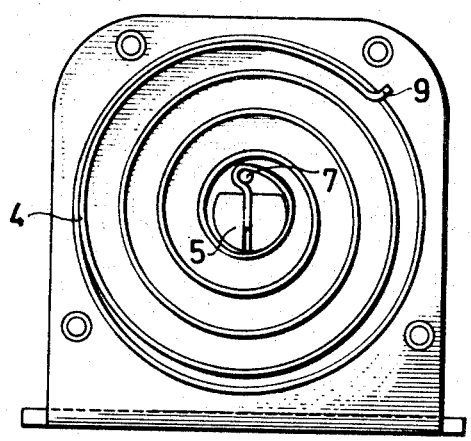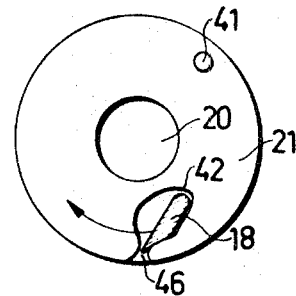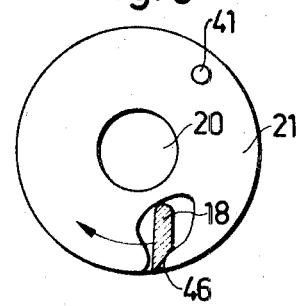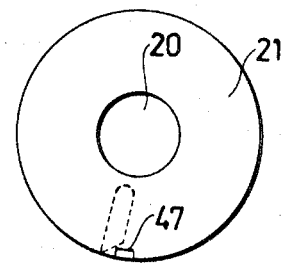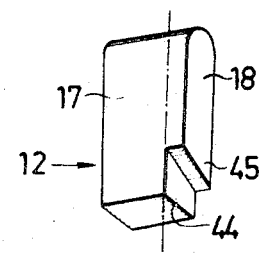

AUTOMATIC LOCKING DEVICE FOR SAFETY BELTS

This invention relates to an automatic locking device for safety belts for use in vehicles, primarily cars.

More specifically this invention relates to an automatic locking device for safety belts of the reeling-type intended to retain a person in a vehicle and comprising a shaft mounted rotatably within a casing for reeling up the belt and a rotor rotatable together with the shaft, on the circumference of which rotor at least one locking pawl is disposed displaceable radially outwardly in response to centripetal forces created by withdrawal of the belt, said locking pawl being adapted to collaborate with at least one locking pawl tooth in the casing.

In known automatic locking devices of the reeling-type which automatically adapt the length of the belt in response to the position taken by the wearer and which allow the wearer to lean forwards in the vehicle due to the fact that the belt can be drawn out in response to the movements of the wearer, it has proved that the bearer must move relatively slowly in order not to cause the automatic locking mechanism to become operative. The locking operation depends entirely on the speed with which the belt is unwound from the shaft by movements of the wearer and is thus not dependent on any acceleration force. Even if a person retained in the safety belt should lean forwards very rapidly in order to grip an article, for example, that the acceleration is not great. However, in a collision, for example, a considerable relative acceleration is created between the wearer and the vehicle.

In consequence one main object of the invention is to provide an automatic locking device which safely locks the belt on great accelerations, but which allows to the wearer to perform rapid body movements.

Further objects and advantages of the invention will become apparent from the following description, considered in connection with the accompanying drawings which form part of this specification, and of which:

FIG. 3 is a lateral view of the automatic locking device viewed from the opposite side and with a side cover plate removed.

FIG. 4 shows the automatic locking device viewed from the same side as in FIG. 1, but with a swingable locking mechanism removed.

FIG. 5 shows an inertia-responsive disc member and a locking tooth constructed according to the invention and presented in normal nonlocking position.

FIG. 6 shows the inertia-responsive disc member and the locking tooth in locking position.

FIG. 7 is a perspective view on an enlarged scale of the locking tooth forming part of the automatic locking device shown in FIGS. 1 through 6, and FIG. 8 illustrates diagrammatically a modified inertia-responsive disc member with a collaborating locking tooth.

Figure 1:
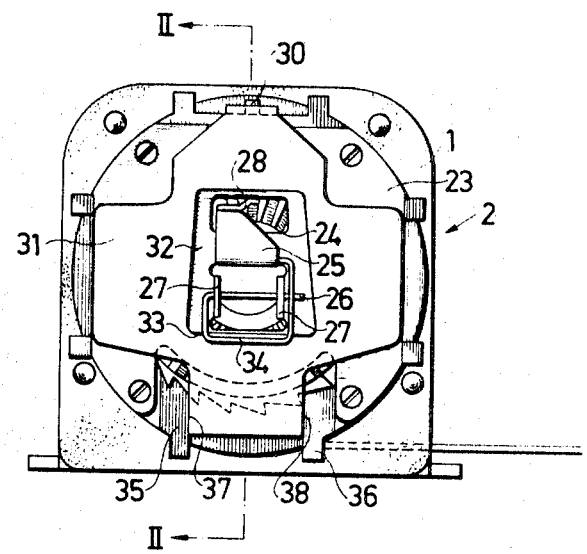
FIG. 1 is a lateral view of a locking device viewed embodying the features of the invention and presented with one side cover plate removed.

In the embodiment shown in FIGS. 1 through 7, reference numeral 1 denotes a U-shaped casing for an automatic locking device generally denoted 2 for a safety belt 3. The safety belt 3 consists of a strap which in known manner by means of a coil spring 4 is wound upon a shaft 5. The ends of the shaft 5 are mounted in bushings 6, which are rotatably mounted in recesses formed in the casing 1. In spaced relation to, and parallel with, the shaft 5 the bushings 6 in addition support a rod 7 which constitutes an interior attachment for the inner end of the strap 3, and outside of one bushing 6 the interior attachment for the spring 4. The coil spring 4 is encased in a lateral cover plate 8, which is attached onto the casing 1. The outer end of the spring 4 is connected to an attachment means 9, which in the illustrated embodiment is an aperture in the lateral cover plate 8.

Figure 2:
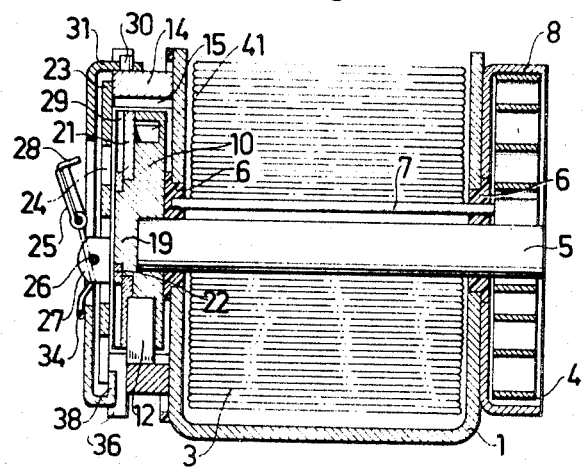
FIG. 2 is a sectional view following line II–II of FIG. 1.

On that end portion of the shaft 5 which is located remote from the end carrying the spring and which projects beyond the left-hand bushing 6 in FIG. 2 and thus beyond the casing 1, a suitably circular, disc-shaped locking means casing or rotor 10 is fixed. In the embodiment shown, this rotor 10 is formed with a wedge-shaped recess 11 within which a locking pawl 12 is mounted pivotably. Of course, it is possible to provide any desired number of recesses and locking pawls along the circumference of the rotor 10, but for case of simplicity only one such device is shown in the drawings. As will be seen form FIG. 4, the top of the wedge-shaped recess 11 is directed approximately towards the center of the rotor 10.

As will be understood best from FIG. 4, which shows the automatic locking device in locked position with the locking pawl 12 engaging a locking tooth 13 of a ratchet member 14, surrounds the rotor 10 and is in rigid connection with the casing 1, the locking surface 15 on each locking tooth of the embodiment shown extends in the radial direction of the rotor, the recess 11 having an also radially extending contact surface 16 for the locking pawl 12. As is most clearly shown in FIG. 7, the locking pawl consists of a locking portion 17 which is located behind the dash and dotted line of FIG. 7, and a guide portion 18 which is located ahead of said dash and dotted line. The locking portion 17 of the locking pawl 12 is positioned within the recess 11 and the guide portion 18 projects from the recess 11 beyond the surface of the rotor 10 as will be understood best from FIG. 2. The rotor 10 is formed with a central cylindric portion 19 which constitutes a guide or journal for a central circular opening 20 in an inertia-responsive disc member 21 the function of which will be explained more below with reference to the FIGS. 5 and 6.

In the embodiment shown in the FIGS. 1 through 7, the inertia-responsive disc member 21 is freely pivotable about the cylindrical journal 19. To prevent the disc member 21 from axially sliding off from the central journal 19 there is provided a washer 22 which rests on a shoulder formed on the central journal and which allows the disc 21 to rotate free sheet about said central journal. A sheet plate 23 covering the rotor 10 and the inertia-responsive disc member 21 and having an opening 24 is fixed onto the ratchet member 14. The opening 24 leaves space for a locking member 25 formed as a two-armed lever, the pivot axis 26 of which is formed in the central portion of the lever, and in the operative position of the locking device extends substantially horizontally, and is mounted between two ears 27 located in spaced relation from one another and projecting from the central portion of the plate 23. The upper arm of the locking member 25 is preferably heavier and/or longer than the lower arm thereof and located so much outside the rotating shaft 26 that it is normally retained in the counterclockwise inclined position shown in FIG. 2.

The upper arm of the locking member 25 is provided with a resilient locking hook 28 devised in, when clockwise inwardly turned position resiliently to engage locking teeth 29 which project radially from the outer surface remote from the rotor 10 of the inertia-responsive disc member 21.

Provided on the upper side of the ratchet member 14 is a pin 30 on which a swingable element 31 is suspended to be freely turnable in both the axial and the radial directions relative to the rotor 10. The swingable element 31, which constitutes an additional locking member, extends substantially transversely to the shaft 5 and at its top has a bent end portion which is formed with a hole into which the pin 30 penetrates. The swingable element 31 has a central opening 32 for the locking member 25, which opening 32 has a lower step edge 33 the lower arm 34 of the locking member 25. Formed on the lower end of the ratchet member 14 are substantially vertical cam surfaces 35, 36 directed outwards from the interior and cooperating with cam surfaces 37 and 38, respectively, at the lower end of the swingable element 31. The function of the mechanism just described will be explained more below.

Formed in the surface of the rotor 10 facing the disc member 21 is an arcuate groove 39 (FIG. 4) housing a pressure spring 40. Bearing against one end of the spring 40 is a pin 41 projecting from the inertia-responsive disc member 21 into the groove 39 within which the pin 41, on a relative turning movement between the rotor 10 and the disc 21, is freely movable against the action of said spring 40.

The guiding of the locking pawl 12 brought about by the inertia-responsive disc member 21 is now described with particular reference to the FIGS. 5 and 6, which show the side of the guide portion 18 facing the rotor 10 and the locking pawl 12 and the position thereof in nonlocked position (FIG. 5) and locked position (FIG. 6).

As will have become evident from the description hereinbefore the disc 21, which preferably is of metal in order to obtain a mass suitable for the intended operation, is freely rotatable on the central journal 19 of the rotor 10 against the action of the spring 40, one end of which bears against an end wall of the groove 39 and the other end of which presses against the pin 41 on the disc member 21.

FIG. 5 illustrates the normal situation in which the pin 41 is kept by the spring 40 pressed against the left-hand end face of the groove 39. The pin 41 in this position is shown in FIG. 4 by dash lines. In this normal, unlocked position the guide portion 18 of the locking pawl 12 is retained by a cam surface 42 in the shown position, and the locking pawl 12 bears against the lateral edge 43 (FIG. 4) of the recess 11 and the point 44 of the pawl body 12 does not project far enough beyond rotor 10 to engage any of the locking teeth 13. The relative position between the cam surface 42 and the guide portion 18 normally remains unchanged on withdrawal of the belt 3, since the disc member 21 due to the coupling between the pin 41 and the spring 40 rotates with the same speed as does the rotor 10. During normal withdrawal of the belt 3 the guide portion 18 and the inertia-responsive disc member 21 will thus move together in the direction of the arrow shown in the FIG. 5 and with the same speed. It should be noted that the rotational speed of the rotor 10 has no importance at all, provided that no substantial acceleration comes into existance.

Should, however, the rotor 10 be accelerated very rapidly, which occurs, for example, when a person secured in the belt is thrown forwards due to a collision, the following cycle will be realized. The inertia-responsive disc member 21 which normally is entrained by the rotor 10 against the action of the pressure force emanating from the spring 40 will, due to the inertia forces which act on the same, not accelerate as rapidly as the rotor 10, and as a consequence the rotor 10 will cause the pawl 12 to pivot relative to member 21, so that the guide portion 18 will move more rapidly than the disc member 21 and follow the cam surface 42 and take the position shown in FIG. 6 in which position its pointed portion 45 (FIG. 7) penetrates through channel 46. In this position of the guide portion 18 the locking pawl 12 has been displaced outwards and taken the radial position shown in FIG. 4 where the locking pawl 12 is in engagement with one of the locking teeth 13.

The critical acceleration on which the locking pawl is released is defined by the force acting on the inertia-responsive disc member i.e. in the embodiment shown, the spring tension of the spring 40. Of course, means may be provided to adjust said spring force and therewith the critical acceleration.

Due to the described locking device a release mechanism is thus obtained which is dependent on the acceleration of the rotor and which is not influenced by its speed.

The swingable mechanism (element 31, etc.) shown and described has for its object to bring about a locking of the inertia-responsive disc member 21 in those cases where strong accelerations which act on a person secured within the belt should not cause a corresponding acceleration of the belt 3 and the rotor 10 which may occur, for example, when the vehicle is rammed laterally. The swingable mechanism constitutes further an additional locking member also in those cases where the rotor 10 reacts on accelerations.

On a strong retardation or a deceleration of the vehicle, which produces a corresponding acceleration of the secured person, the swingable element 31 will be displaced outwards and/or towards one or the other side. When the swingable element 31 moves outwards, its stop edge 33 will guide the lever arm 34 in an outward direction and the hook 28 will engage a tooth 29 on the inertia-responsive disc member 21, or will frictionally slide over a plurality of teeth 29, whereby the disc member 21 will be displaced in relation to the rotor 10 so as to cause the locking condition illustrated in FIG. 6 to be brought about. On a solely lateral swinging movement of element 31 one of the cam surfaces 37, 38 will slide on the appertaining cam surface 35, or 36, respectively, and thereby the swingable element 31 will be swung outwardly and thereby the locking described above of the inertia-responsive disc member 21 will be brought about by means of the resilient hook 28. It is of importance that the hook 28 is resilient in order not to cause any damages by the engaging operation.

The locking pawl 12 need not be swingable and displaceable within a wedge-shaped recess, but may well be only radially displaceable, the inertia-responsive disc member 21 then being provided with a guide surface, having, for example, the form of a stop 47 (FIG. 8) normally bearing against an inclined cam surface on the locking tooth and preventing the same from sliding radially outwards under normal conditions but being drawn away when due to high acceleration a relative movement takes place between the inertia-responsive disc member 21 and the rotor 10. The cam surface of the locking pawl must be formed so that said pawl is returned to its retracted or inoperative position by the member 47 when the disc member is readjusted into nonoperative position. The force originating from the spring 40 and acting on the inertia-responsive disc member 21 may be replaced by a frictional force between the disc member 21 and the rotor 10, in which case the disc member 21 must be manually readjustable into its nonoperative position.

While several more or less specific embodiments of the invention have been shown and described, it is to be understood that this is for purpose of illustration only, and that the invention is not to be limited thereby, but its scope is to be determined by the appended claims.

What I claim is:

1. An automatic belt locking device for a safety belt for retaining a person in a vehicle, comprising
   a casing fixed to said vehicle,
   a shaft rotatably mounted in said casing,
   a safety belt fastened at one end to the shaft and to be wound thereabout but withdrawable from said casing,
   resilient means in said casing resisting rotation of said shaft upon withdrawal of said belt from said casing,
   a stationary catch positioned in said casing radially outwardly of said shaft,
   a rotor fixed to said shaft for rotation therewith in said casing,
   a pawl mounted adjacent the circumference of said rotor to be movable radially outwardly toward and into engagement with said catch in response to centrifugal forces created by the withdrawal of said belt from said casing,
   an inertia member coaxial with said rotor and rotatably mounted on said shaft,
   means connecting said inertia member to said rotor and operative normally, when the angular acceleration of said rotor does not exceed a predetermined value, to maintain said member in a first angular position relative to said rotor in which said member is driven at the same speed as said rotor, and operative, when said acceleration does exceed said value, because of the inertia of said member to move said member to a second angular position relative to said rotor, and
   means on said member engaging said pawl normally to prevent said pawl from moving radially outwardly into engagement with said catch when said member is in said first position, and operative to release said pawl into engagement with said catch when said member is in said second position, thereby to stop further withdrawal of said belt.

2. The automatic locking device of claim 1, wherein said member is mechanically coupled to said rotor by means of a spring.

3. The automatic locking device of claim 2, wherein
said spring is a compression spring which is mounted in an arcuate groove in the surface of said rotor facing the inertia member,
one end of said spring bearing against one end of said groove and the other end thereof against a pin which is freely slidable within said groove,
said pin being rigidly secured to the inertia member and kept by said spring against the other end of said groove when the inertia member is disposed in its first position.

4. The automatic locking device of claim 1, wherein said connecting means comprises means for coupling said inertia member to said rotor by means of a frictional force.

5. The automatic locking device of claim 1, including
an additional locking mechanism to lock said inertia member on occurrence of predetermined acceleration forces of the magnitude causing displacement of the disc member into its other position,
said inertia member having a plurality of radially arranged locking teeth on one side thereof, and
said additional locking mechanism comprising a two-armed locking member mounted on said casing on a horizontal pivot, the upper arm of said locking member being provided with a resilient locking hook devised normally to be retained out of engagement with said locking teeth on said inertia member,
a swingable element mounted on said casing and having one guiding edge positioned between the inertia member and the lower arm of said two-armed locking means, whereby upon a swinging movement of said element in response to predetermined changes in the acceleration of said vehicle, said element is operative to move said lower arm outwardly, thereby to move the locking hook of the upper arm inwardly into engagement with the locking teeth of inertia member.

6. The automatic locking device of claim 5, wherein
said swingable element is mounted for freely pivotable movement above the upper arm of the locking member for swinging movement in a plane parallel to that of said inertia member upon lateral thrust on said casing,
said casing has spaced cam surfaces,
the lower part of said element is formed with guide surfaces adapted to cooperate with said cam surfaces in such a manner that the swingable element during a swinging movement in said plane is simultaneously swung outwards to turn said upper arm inwards toward the inertia member.

7. The automatic locking device of claim 1, wherein
said inertia member comprises a disc mounted on said shaft coaxially thereof adjacent said rotor,
said pawl pivots about its inner end in a wedge-shaped recess in said rotor, and projects into a cam slot in said disc, and
said cam slot is shaped normally to hold said pawl in an inoperative position in which the outer end thereof is radially spaced inwardly from said catch when said disc is in said first position, and to pivot said pawl to an operative position in which said outer end thereof projects from said recess into engagement with said catch, when said disc is in said second position.

8. The automatic locking device of claim 1, wherein
said pawl is slidable radially in a slot in said rotor between a retracted position in which its outer end is spaced radially inwardly of said catch, and locking position in which said outer end engages said catch, and
said means on said inertia member comprises a lateral projection on said member engaging an inclined surface on said outer end of said pawl normally to hold the latter retracted, and movable out of engagement with said surface, when said member is moved to its second position to allow said pawl to engage said catch.